United States Patent [19]
Popp et al.

[11] Patent Number: 6,073,710
[45] Date of Patent: Jun. 13, 2000

[54] COMBINATION DRILLING MEMBER

[75] Inventors: Franz Popp, Buchloe; Heinz Bisping, Augsburg; Thomas Belz, Kaufering, all of Germany

[73] Assignee: Hilti Aktiengesellschaft, Schaan, Liechtenstein

[21] Appl. No.: 09/044,212

[22] Filed: Mar. 18, 1998

[30] Foreign Application Priority Data

Mar. 18, 1997 [DE] Germany .............................. 197 11 261

[51] Int. Cl.⁷ .................................................. E21B 10/26
[52] U.S. Cl. ........................ 175/388; 175/414; 408/200; 408/713
[58] Field of Search ..................... 175/388, 390, 175/394, 395, 414; 408/200, 220, 713

[56] References Cited

U.S. PATENT DOCUMENTS

| 2,964,115 | 12/1960 | Clatfelter | 175/388 |
|---|---|---|---|
| 3,138,183 | 6/1964 | Stewart | 175/388 |
| 5,078,552 | 1/1992 | Albel . | |
| 5,222,842 | 6/1993 | Schweikert et al. | 408/225 |

FOREIGN PATENT DOCUMENTS

| 0086452 | 9/1986 | European Pat. Off. . |
|---|---|---|
| 507949 | 9/1920 | France . |
| 6813225 | 12/1968 | Germany . |
| 2122119 | 5/1972 | Germany . |
| 2402516 | 7/1975 | Germany . |
| 8403969 | 5/1984 | Germany . |
| 9206757 | 8/1992 | Germany . |
| 9106606 | 9/1992 | Germany . |
| 639490 | 6/1950 | United Kingdom . |

*Primary Examiner*—William Neuder
*Attorney, Agent, or Firm*—Brown & Wood, LLP

[57] ABSTRACT

A combination drilling member includes an axially elongated drill, such as used for drilling rock, having an axially extending shaft (2) with a first end leading in the drilling direction containing a cutting bit (3). The shaft (2) has at least one helical drilled material removal groove (4) and an auxiliary element encircling and detachably connected to the shaft (2) intermediate the ends thereof. The auxiliary element (6) has at least one elastic plastic part (9) extending around the shaft and containing a through hole (10) for the shaft where the plastic part is secured to the shaft by at least one of frictional and positive locking engagement against inadvertent axial displacement and held against relative rotation to torques of up to 40 Nm.

15 Claims, 1 Drawing Sheet

COMBINATION DRILLING MEMBER

BACKGROUND OF THE INVENTION

The present invention is directed to a combination drilling member formed of an axially elongated drill, such as for drilling rock, with a cutting bit at the leading end of the drill. The drill has an axially extending shaft with helical drilled material removal grooves extending between its ends. An auxiliary element is secured to the shaft.

Combination drilling members for drilling equipment are driven rotationally and include a drill and an auxiliary element positioned on the drill and secured to it so that torque can be transferred from the drill shaft to the auxiliary element. For example, the auxiliary element may be a milling head or a countersinking head. When the combination drilling member is used, initially a borehole is cut by the drill and subsequently, in the same operation, towards the end of the drilling operation, a depression or recess area is milled in the surface of a receiving material or of a component to be connected to it. In such a known combination drilling member, the milling or counter-sinking head is fixed to the shaft of the drill so that it cannot be detached, for example, by welding or integral molding. It can be noted immediately, in such combination drilling member, that a separate combination drilling member having the desired diameter, must be utilized for each drilling diameter to be used. If deeper countersinking or a recess of larger diameter is desired, a separate combination drilling member must be used. Moreover, drilling combination members cannot be obtained in all combinations. If the drill or the auxiliary element is damaged, such as damage to the milling or countersinking head, the combination drilling member is not usable and must be replaced as a whole.

From the patent publication EP-B-O 86 462, a combination drilling member is known, permitting a drilled hole to be cut in a receiving material in one working operation and, at the same time, a countersunk hole can be provided in the surface of an insulating panel to be secured to the receiving material. This known combination drilling member is formed with a drill and a milling head connected by a bolt to the shaft of the drill. The connection of the milling head to the shaft is detachable. As a result, the drill can be used with milling heads of different sizes, or a milling head can be used with drills of different diameters. If the milling head or the drill is worn or damaged, it can be replaced. For the detachable connection between the drill and the milling head, the shaft of the drill, adjoining the helical drilled material removal groove, can be provided with a thread. A stop shoulder on the shaft serves to fix the milling head along the axial head of the shaft. The metal milling head is provided with a hole having an internal thread, matched to the thread on the drill shaft. The milling head is connected to the shaft by bolts. To change the axial position of the milling head, washers of appropriate thickness can be positioned between the milling head and the stop shoulder.

As compared to the combination drilling members where thee auxiliary element, such as a milling head is fixed to the shaft, this known combination drilling member has the advantage that the milling head or the drill is replaceable, since the bolted connection can be removed. The bolted connection, however, is not particularly durable. Particularly when used with axially directed impact-supported drilling equipment, the durability of the bolted connection is considerably less than the useful lifetime of the drill. Due to the action of the axial impacts, the thread on the shaft of the drill and/or in the hole of the milling head is damaged in the course of time. As a result, the milling head may no longer be detachable from the shaft or, when the bolted connection is removed, the threads are damaged to such an extent that the milling head and/or the drill can no longer be connected to one another or connected with other drills or milling heads. In this combination drilling member known from the state of the art, a specially constructed drill is required. A thread must be formed on the shaft of the drill adjoining the drilled material removal grooves. For axially fixing the milling head to the shaft, a stop shoulder is required at the end of the threaded section of the shaft. Such an arrangement complicates the manufacture of the drill and makes the combination drilling member more expensive.

SUMMARY OF THE INVENTION

Therefore, a primary object of the present invention is to provide a combination drilling member, so that its service life is determined by the service life of the drill. Accordingly, a combination drilling member is formed of a drill and an auxiliary element detachably connected together. The combination is largely insensitive to axial impacts of impact drilling equipment or hammer drills. A specially constructed drill is not required. Instead, a combination drilling member is provided where different auxiliary elements can be connected to conventional commercial drills. Such a combination drilling member is cost effective and easy to produce. The user can easily assemble the desired combination drilling member having the desired diameters and functions.

In accordance with the present invention, a combination drilling member is provided where the drill and the auxiliary element can be detachably fixed together. Such a combination drilling member comprises a drill, such as for use in drilling rock, equipped at its leading drilling end with a cutting bit having cutting edges and a shaft having at least one helical drilled material removal groove, and an auxiliary element detachably connected to the drill shaft. The auxiliary element has at least one elastic plastic part provided with a through hole for receiving the shaft of the drill and secured to the shaft against unintentional axial displacement by a frictional and/or positive locking connection and held so that it cannot rotate relative to the shaft when subjected to torques of up to 40 Nm.

The auxiliary element is provided with one or more elastic plastic parts each with an axially extending through hole for effecting connection with the drill shaft. The shaft is simply pushed through the through hole of the plastic part and fixed axially so that it cannot rotate relative to the shaft due to a frictional and/or positive locking connection. The auxiliary element is mounted on the shaft, for example, by means of a screw press. The screw press can also be used for removing the auxiliary element. Because of the elasticity of the plastic parts, the auxiliary element can be used with drills of different diameters. A drill with a specially formed shaft with a thread and stop holder is not required. The auxiliary element is simply pressed onto the shaft of conventional commercial drills. As a result, a simple and cost-effective manufacture of the combination drilling member is made possible. The auxiliary element can be removed when it is not required. Therefore, the drill is the same as conventional drills. Due to the elasticity of the plastic parts, the connection between the auxiliary elements and the shaft is largely insensitive to axial impacts having a frequency of up to 4,000 impacts per minute with a single impact energy of up to 7 J and exerted during the operation of the drill in the combination drilling member. Accordingly, the service life of the combination drilling member is determined essentially by the service life of the drill. If it is damaged, the auxiliary element can be easily replaced. In the event the drill fails, a new drill of the desired diameter can be connected to the auxiliary element.

The through hole of the plastic parts has a diameter corresponding to the diameter of the shaft multiplied by a factor of about 0.35 to 0.85. The auxiliary element is held by a press fit to the shaft of the drill. The press fit can be augmented by positive locking engagement between the elastic plastic part or parts and the removal grooves in the drill.

To achieve the desired transfer of torque, it is advantageous if the plastic part or parts have an overall axial dimension which is at least 15% of the axial length of the shaft and is smaller than the length of the shaft. In the event there is only one plastic part, the overall axial dimension refers to the axial extent of the single plastic part. If the auxiliary element is made up of several plastic parts, the overall axial dimension refers to the sum of the axial dimensions of the individual plastic parts.

On one hand, the materials forming the plastic parts have an adequately high elasticity, so that connection between the auxiliary element and the drill shaft is largely insensitive to axial impact occurring during the operation of a combination drilling member and, on the other hand, build up an adequately high frictional connection with the shaft. Thermoplastic or cross-linked elastomers with a DIN 53505 Shore A hardness of about 50 to 100 and a DIN 53504 breakage elongation of not less than 150% have proved to be very appropriate.

It is advantageous for transferring torques and for the axial stability of the auxiliary element if the at least one plastic part has an outside diameter in the ratio with the diameter of the hole in the plastic element which is not less than 1.5 and not greater than 5.

In a preferred embodiment of the combination drilling member, the at least one elastic plastic part is held within a basically sleeve-shaped receiving part. In such an arrangement, the receiving part has an inside diameter smaller than the outside diameter of the plastic part. The hardness of the receiving part is greater than that of the plastic part, preferably the receiving part is a metal sleeve. Accordingly, the plastic part is held in a receiving part basically by a press fit. The press fit can be supported by positive locking by forming the inside surface of the receiving part to strengthen the rotation-proof connection between the receiving part and the at least one plastic part even further.

The auxiliary element of the combination drilling member can have different functions. For example, it can be a milling head or a core drill. In another embodiment of the inventive combination drilling member, it can serve as a bit stop. For different applications, a sleeve-shaped receiving part is equipped at its leading end facing toward the cutting end of the drill, with cutting elements, marking elements and the like. Preferably, the cylindrical outside surface of the receiving part is smooth. As a result, several different functions can be carried out by the one auxiliary element. In particular, because of the smooth outside surface of the receiving part, the auxiliary element can afford a lateral guiding function during the drilling operation by means of a component positioned at a distance from the receiving material being drilled.

The axial distance of the cutting elements, marking elements or the like, located on the sleeve-shaped receiving part, from the cutting bit of the drill is adjustable, in that the at least one plastic part can be shifted axially along the shaft. Washers are not required to fix the axial position of the auxiliary element on the shaft. The auxiliary element is fixed basically by the press fit with the shaft.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
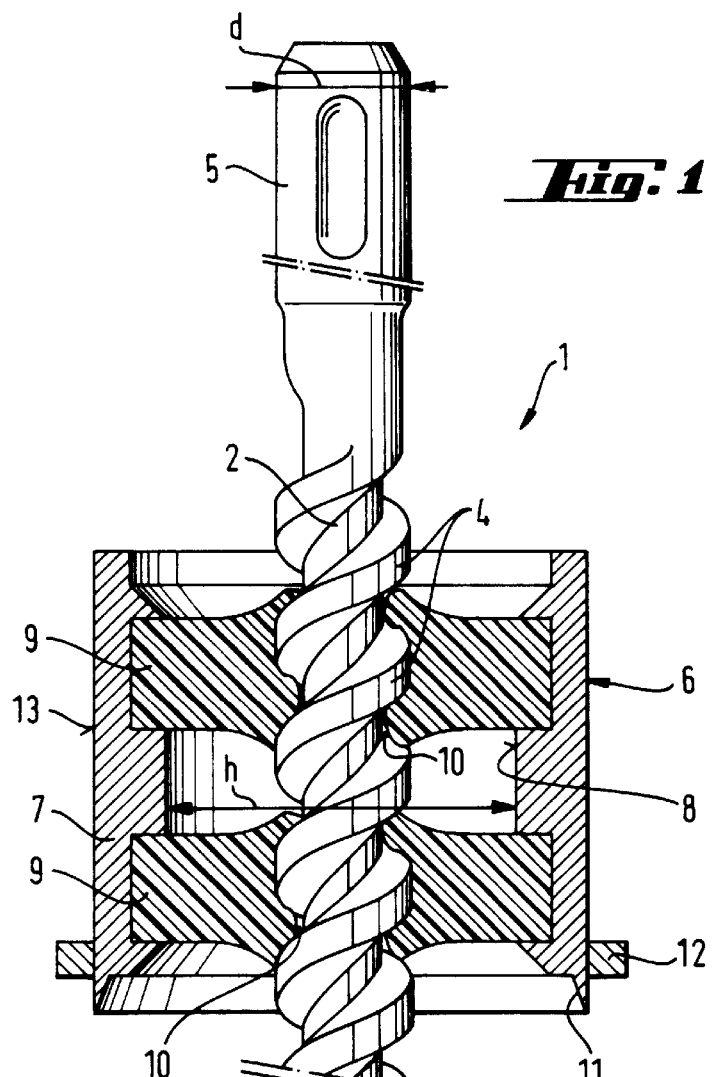
FIG. 1 is an axially extending view of a combination drilling member embodying the present invention and shown partly in section.

In FIG. 1 a combination drilling member 1 is shown. The combination drilling member is formed of an axially extending drill, such as used in drilling rock, having an axially extending shaft 2 with a leading first end shown facing downwardly in FIG. 1 and a trailing second end. At the first end there is a cutting member or bit 3 with cutting edges. The shaft 2 has helical drilled material removal grooves 4 extending from adjacent the cutting member 3 to a chuck insertion end 5 located at the second end of the drill. The insertion end 5 has a cylindrical shape similar to that used in percussion drilling equipment with clamping jaws. In FIG. 1, the insertion end 5 is formed for a tool carrier or chuck of a hammer drill equipment.

On the drill shaft 2 an auxiliary element 6 is fixed, as shown by way of example, and is equipped at its leading end, facing the cutting member 3, with cutting elements 11. The auxiliary element 6 is detachably connected to the shaft 2 by elastic plastic parts 9 extending transversely of the axis of the shaft and secured within a cylindrical metal sleeve 7. The shaft 2 of the drill extends through concentrically arranged axially extending through holes 10 of the plastic parts 9. The diameter i of the through holes 10 is less than the diameter d of the shaft 2. When the plastic parts 9 are pushed onto the shaft 2, they cannot expand at their outside diameter in the radial direction, since they are held within the rigid metal sleeve 7 in a press fit. The press fit is developed because the inside diameter h of the metal sleeve 7 is smaller than the outside diameter a of the plastic parts 9, note FIG. 2. The press fit of the plastic parts can be augmented by a positive locking engagement due to the recessed inside surface of the metal sleeve 7. Note that the recessed inside surface 8 has a pair of annular recesses in which the outside surfaces of the plastic parts are secured. The recesses in the inside surface 8 are spaced apart in the axial direction of the sleeve 7.

Basically, the connection or engagement of the auxiliary element 6 and the shaft 2 of the drill is effected by the frictional connection, in that the plastic parts are compressed by the shaft 2 having a larger diameter d than the diameter i of the through holes 10 in the plastic parts 9. The compression of the plastic parts 9 is illustrated in FIG. 1 by the flow of the plastic parts material in the edge region of the holes 10. Further, the frictional connection is aided by a positive locking of the elastic material of the plastic parts 9 within the drilled material removal grooves 4 of the drill shaft 2. The installation of the auxiliary element 6 on the shaft 2 of the drill and the adjustment of the axial distance of the cutting elements 11 of the auxiliary element from the cutting member 3 is effected, for example, with the help of a screw press. In place of the screw press, a suitably constructed lever tool, with which the necessary pressures can be applied, can also be used.

Figure 2:
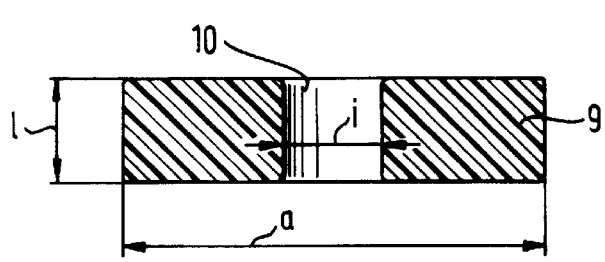
FIG. 2 is a sectional view of an elastic plastic part forming a part of the combination drilling member illustrated in FIG. 1 before the plastic part is fitted on the drill shaft.

The axial dimension of the plastic parts 9 adds up to a total thickness 1, note FIG. 2, which is at least 15% of the axial length of the shaft 2 and is less than the axial length of the shaft. The ratio of the outside diameter a of the plastic parts 9 to the diameter i of the through hole 10 is not smaller than 1.5 and not larger than 5. The diameter i of the through hole 10 corresponds to the diameter d of the shaft 2 of the drill, multiplied by a factor of about 0.35 to 0.85. The frictional and positively held auxiliary element 6 is fixed axially and arranged to transfer torques of up to 40 Nm. The plastic parts 9 are formed of a thermoplastic or cross-linkable elastomer with a Shore hardness A measured according to DIN 53505, of about 50 to 100, and a breakage elongation, measured according to DIN 53504, of not less than 150%.

As shown in FIG. 1, the cutting elements 11 of the auxiliary part 6 are located at the leading end of the metal sleeve 7. Metal sleeve 7 has a smooth outside surface 13 which can be used, for example, for lateral guidance. If the auxiliary element 6 is used as a bit stop 12, a shoulder in the form of an annular collar or ring 12 extends around the leading end of the sleeve located at the outside surface 13 positioned at the trailing end of the cutting elements 11. The combination drilling member 1, shown in FIG. 1, is equipped with an auxiliary element 6 having cutting elements 11 and a collar or ring 12. As a result, the combination drilling member 1 is suitable for drilling and cutting or marking in a single step operation, with the collar 12 representing a bit stop. Note in FIG. 1 that the collar 12 is spaced at the trailing end of the cutting elements 11. It is self-evident that the auxiliary element 6 may also have less than the functional parts shown in FIG. 1. As an example, its leading end can be conically shaped at the shaft 2 of the drill and equipped in the conically shaped region with cutting elements. If the auxiliary element is formed in this manner, it is a milling head for milling a depression in the receiving material being drilled or in a component to be connected to the receiving material. In much the same way as the example shown in FIG. 1, the auxiliary element may be equipped at its leading end with an annular cutting edge acting as a marking cutting edge with a bit-stop function. For the expert, other examples of auxiliary elements are conceivable which, based on the invention, can be connected with the shaft of the drill into a combination drilling member.

While specific embodiments of the invention have been shown and described in detail to illustrate the inventive principles, it will be understood that the invention may be embodied otherwise without departing from such principles.

We claim:

1. A combination drilling member comprising an axially elongated drill, such as for drilling rock, said drill having a first end leading in a drilling direction and a second end trailing in the drilling direction, said first end having a cutting member (3), said drill having an axially extending shaft (2) with at least one helical drilled material removal groove (4) extending for at least an axially extending portion of said shaft between the first and second ends, an auxiliary element (6) detachably connected to said shaft for rotation therewith, said auxiliary element comprising at least one elastic plastic member (9) extending around said shaft transversely of the axial direction thereof and deformably engaged with said shaft, said plastic member having a through hole (10) extending therethrough in the axial direction of said shaft, said shaft extending through the through hole (10) and said auxiliary element being secured to said shaft by at least one of frictional and positive locking arrangement against inadvertent axial displacement and held against relative rotation with said shaft to torques up to 40 Nm.

2. A combination drilling member, as set forth in claim 1, wherein said through hole (10) in said plastic part (9) has a diameter (i) corresponding to a diameter (d) of said shaft (2) multiplied by a factor of about 0.35 to 0.85.

3. A combination drilling member, as set forth in claim 1 or 2, wherein said at least one plastic part (9) has a total axial dimension (1) which is at least 15% of the axial length of said shaft (2) and is less than the axial length of said shaft (2).

4. A combination drilling member, as set forth in claim 1 or 2, wherein said at least one plastic part (9) is formed of a thermoplastic or cross-linked elastomer with a Shore A hardness, determined according to DIN 53505, of about 50 to 100 and a breakage elongation, determined according to DIN 53504, of not less than 150%.

5. A combination drilling member, as set forth in claim 3, wherein said at least one plastic part (9) is formed of a thermoplastic or cross-linked elastomer with a Shore A hardness, determined according to DIN 53505, of about 50 to 100, and a breaking elongation, determined according to DIN 53504, of not less than 150%.

6. A combination drilling member, as set forth in claim 1 or 2, wherein said at least one plastic part (9) has an outside diameter (a), and the ratio of the outside diameter (a) to the diameter (i) of the drill is not less than 1.5 and not greater than 5.

7. A combination drilling member, as set forth in claim 4, wherein said at least one plastic part (9) has an outside diameter (a), and the ratio of the outside diameter (a) to the diameter (i) of the drill is not less than 1.5 and not greater than 5.

8. A combination drilling member, as set forth in claim 5, wherein said at least one plastic part (9) has an outside diameter (a), and the ratio of the outside diameter (a) to the diameter (i) of the drill is not less than 1.5 and not greater than 5.

9. A combination drilling member as set forth in claim 6, wherein said at least one elastic plastic part (9) is held within a sleeve-shaped receiving part (7) and the inside diameter (h) of said receiving part (7) is smaller than the outside diameter (a) of said plastic part (9) and has a hardness greater than that of said plastic part (9).

10. A combination drilling member, as set forth in claim 9, wherein said sleeve-shaped receiving part (7) has a first end closer to the first end of said drill and the first end of said receiving part having one of cutting elements (11) and marking elements.

11. A combination drilling member, as set forth in claim 10, wherein said cutting elements (11) and marking elements on said receiving part (7) being spaced axially from said cutting member (3), and said plastic part is axially displaceable along said shaft (2).

12. A combination drilling member, as set forth in claim 9, wherein said receiving part (7) has an inside surface with at least one annular groove therein for receiving said plastic part (9).

13. A combination drilling element, as set forth in claim 1 or 2, wherein said plastic part (9) is formed of one of a thermoplastic and cross-linked elastomer with a Shore A hardness, according with DIN 53505, in the range of 50 to 100 and a breakage elongation, according to DIN 53504, of not less than 150%.

14. A combination drilling member comprising an axially elongated drill, such as for drilling rock, said drill having a first end leading in a drilling direction and a second end trailing in the drilling direction, said first end having a cutting member (3), said drill having an axially extending shaft (2) with at least one helical drilled material removal groove (4) extending for at least an axially extending portion of said shaft between the first and second ends thereof, an auxiliary element (6) detachably connected to said shaft (2) for rotation therewith said auxiliary element comprising at least one elastic plastic member (9) positioned within an axially extending sleeve-like receiving part (7), said plastic member extending transversely of the axial direction of said shaft and deformably engaged with said shaft, said plastic member having a through hole extending therethrough in the axial direction of said shaft, said auxiliary element (6) having a first end located closer to and spaced axially from said cutting member (3), said auxiliary element being secured to said shaft by at least one of frictional and positive locking engagement against inadvertent axial displacement and held against relative rotation with said shaft to torques up to 40 Nm, said through hole having a diameter (i) corresponding to a diameter (d) of said shaft (2) multiplied by a factor of about 0.35 to 0.85, said at least one plastic member (9) has a total axial dimension (1) within said sleeve-like part at least 15% of the axial length of said shaft (2) and less than the axial length of said shaft (2), and said at least one plastic member (9) being formed of one of a thermoplastic and cross-linked elastomer with a Shore A hardness, determined according to Din 53505, of about 50 to 100 and a breaking elongation, determined according to DIN (53504), of not less than 150%.

15. A combination drilling member, as set forth in claim 14, wherein said sleeve-shaped receiving part (7) has a first-end closer to the first end of said drill and said first end of said receiving part having one of cutting elements and marking elements, said receiving part (7) having an inside diameter smaller that an outside diameter (a) of said plastic element (9), said receiving part (7) having a hardness greater than that of said plastic element (9), and said auxiliary element (6) being located in the axially extending range of said removal grooves (4).

* * * * *